Patented Mar. 7, 1939

2,149,473

UNITED STATES PATENT OFFICE 2,149,473

IMIDAZOLINES

Adolf Sonn, Konigsberg, Germany, assignor to the firm of Society of Chemical Industry in Basle, Basel, Switzerland No Drawing. Application September 10, 1937, Serial No. 163,324. In Germany July 31, 1934

3 Claims. (Cl. 260—309)

The present application is a continuation-in-part of my copending application Serial No. 33,911, filed July 30, 1935.

It has been found that imidazolines of the general formula

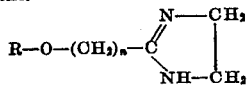

wherein R stands for a member of the group consisting of substituted and unsubstituted phenyl, naphthyl, and quinolyl radicals, the substituent being a member of the group consisting of alkyl, alkenyl, hydroxy and alkoxy derivatives and $n$ stands for the numbers 1 to 6, can be obtained by causing iminoethers of the general formula

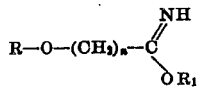

wherein R and $n$ have the signification indicated above and $R_1$ stands for an alkyl radical, to react with ethylene diamine.

The iminoethers may be caused to react with ethylene diamine in the form of free bases or as salts of mineral acids, in the presence or absence of a solvent such as alkanols or alkyl polyhalides at room temperature or at a raised temperature. When the reaction is carried out at low temperature and particularly when using free iminoethers, a neutral gas is preferably passed through the composition, for the purpose of removing the ammonia formed in the course of the reaction. When using a free iminoether and in the absence of a solvent, the crude imidazoline is obtained directly after the reaction is at an end, which can be recognized by the discontinuation of the evolution of ammonia. The crude imidazoline can be purified by distillation or crystallization. When using however a salt of an iminoether as well as a solvent, the solvent is distilled when the evolution of ammonia is finished, the residue is recrystallized or mixed with a strong lye, and extracted with an organic solvent insoluble in water. After drying the solution of the extraction with one of the usual alkaline drying agents, the solvent is expelled and the residual imidazoline base is either distilled or recrystallized.

The iminoethers used as parent materials are produced from the corresponding nitriles by dissolving the latter in alkanols or in other organic solvents to which an alkanol has been added, mixing them at low temperature with a mineral acid and allowing them to stand for several hours.

It is known to produce 2-alkyl-imidazolines by heating the salts of aliphatic 1:2-diamines with salts of fatty acids [Ladenburg, "Berichte der deutschen Chem. Gesellschaft", vol. 27, pages 2952-57 (1894), Klingenstein, loco citato vol. 28, pages 1175-76 (1895)]. 2-phenyl-imidazoline can be obtained by causing thiobenzamide to react with ethylene diamine [G. Forssel, loco citato vol. 25, pages 2132-42 (1892)] or by the action of benzimino-ethylether on bromethylamine hydrobromide in the presence of sodium alcoholate [Stollé et al., "Journal für praktische Chemie", vol. 140, page 60 (1934)]. Compounds of the kind indicated above are also obtained by the action of iminoethers of higher fatty acids on diamines [Bockmühl et al., U. S. Patent 1,958,529 (1934)]. Further it is known to obtain μ-glyoxalidine-arylmethylols by the action of alkylene diamines on iminoethers of substituted mandelic acids [Bockmühl et al., U. S. Patent 1,999,989 (1935)].

The new compounds, the salts of which are all easily soluble in water, have essential pharmacological advantages over the known compounds indicated above. Thus, for example the blood pressure of the rabbit is increased to a much greater extent.

The following table illustrates the high effectiveness of compounds obtainable according to the present process:—

| Compound | Minimal dose in grams per kg. of rabbit effecting the blood pressure, applied intravenously |
|---|---|
| 2-[2'-methoxy-phenoxy-methyl]-imidazoline | 0.00001 |
| 2-[thymoxy-methyl]-imidazoline | 0.0000001 |
| 2-[naphthoxy-(1')-methyl]-imidazoline | 0.000001 |

The following examples illustrate the invention, the parts being by weight:—

Example 1

Hydrogen chloride is introduced into a cooled mixture of equimolecular quantities of 2-methoxy-phenoxyacetonitrile and alcohol and the 2-methoxy-phenoxyacetimidoether-hydrochloride thus obtained of the formula

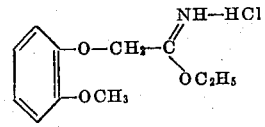

is triturated with an indifferent solvent, such as petroleum ether, ether or benzene. It is obtained in the form of a colorless crystalline powder sensitive to moisture.

24.5 parts of this imidoether-hydrochloride are mixed with 6.5 parts of ethylenediamine and alcohol and heated on the water-bath until the evolution of ammonia ceases. The solution thus formed is filtered, the solvent is distilled and the residue recrystallized from little alcohol. The 2-[2'-methoxy-phenoxy-methyl]-imidazoline-hydrochloride of the formula

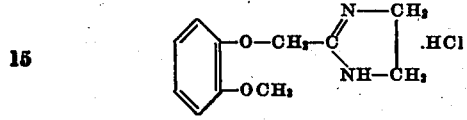

is thus obtained in the form of colorless crystals of melting point 167–169° C. The iminoether may also be produced in the presence of a solvent such as alcohol, ether, benzene, petroleum ether, chloroform, or ethylene dichloride.

Instead of hydrogen chloride there may be used other mineral acids, for instance hydrobromic acid or sulfuric acid. In like manner, instead of ethyl alcohol there may be used other alcohols, for example methyl alcohol or butyl alcohols.

In similar manner there may be produced other 2-[phenoxy-alkyl]-imidazolines, for example 2-[phenoxy-methyl]-, 2-[phenoxy-propyl]-, 2-[phenoxy-hexyl]-, 2-[α-phenoxy-hexyl-(δ)-]-, 2-[-hydroxy-phenoxy-alkyl]-, 2-[alkoxy-phenoxy-alkyl]- such as 2-[butyloxy-phenoxy-alkyl]-imidazolines.

Example 2

Hydrogen chloride is introduced into the cooled chloroform solution of equimolecular quantities of alcohol and thymoxy-acetonitrile (of boiling point 118° C. under 0.8 mm. pressure obtained for example from thymol and chloroaceto nitrile in the presence of an acid binding agent). After some hours the solvent is distilled. The thymoxy-acetiminoether-hydrochloride thus formed of the formula

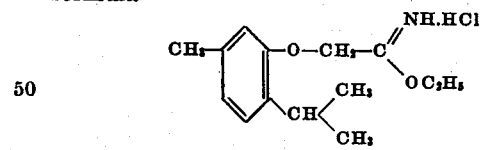

is left as a crystalline mass.

27 parts of this iminoether-hydrochloride are mixed with 6.5 parts of ethylene diamine and alcohol and heated on the water-bath until the evolution of ammonia ceases. The alcoholic solution is filtered, evaporated to dryness and the residue is boiled with acetone whereby the 2-[thymoxy-methyl]-imidazoline-hydrochloride of the formula

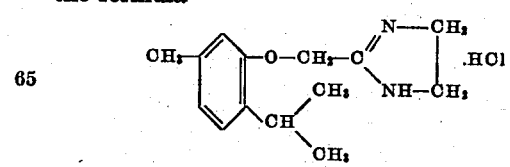

thus formed is left as a colorless crystalline powder of melting point 215–217° C. It is easily soluble in water.

Other 2-[phenoxy-alkyl]-imidazolines alkylated in the phenyl nucleus, such as for example 2'-, 3'- or 4'-methyl-, and 2'-methyl-5'-isopropyl-, 4'-propenyl-, 2'-methoxy-4'-allyl-, 2'-methoxy-6'-allyl-(phenoxy-methyl)-, -(phenoxy-propyl)- or -(phenoxy-butyl)-imidazolines may be obtained according to the same process.

Example 3

A solution of 10 parts of alcohol and 8 parts of hydrogen chloride in ether is mixed while cooling with 36.6 parts of α-naphthoxy-acetonitrile (of melting point 65° C. obtained for example by the action of α-naphthol on chloro-aceto-nitrile in the presence of acid binding agents). The α-naphthoxyacetimino-ether hydrochloride of the formula

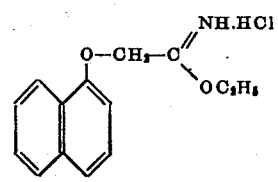

thus obtained crystallizes after a short time in the form of colorless crystals. 26.5 parts of this compound are mixed with 6.5 parts of ethylene diamine dissolved in alcohol and heated on the water-bath for several hours. The solution which is filtered hot precipitates colorless crystals on cooling which may be recrystallized from little water. The new compound, i. e. the 2-[naphthoxy-(1')-methyl]-imidazoline-hydrochloride of the formula

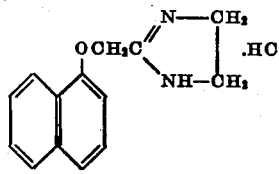

melts at 228–230° C.

Instead of the iminoether-hydrochloride the free iminoether ether may also be used for the reaction.

In analogous manner there is also obtained for example 2-[naphthoxy-(2')-methyl]-, 2-[naphthoxy-(2')-propyl]-, 2-[7'-methoxy-naphthoxy-(2')-methyl]-, or 2-[1'-allyl-naphthoxy-(2')-methyl]-imidazoline.

The imidazolines of the quinoline series may also be obtained, for example 2-[quinolyl-(6')-oxy-methyl]-, 2-[quinolyl-(8')-oxy-propyl]-, 2-[6'-methoxy-quinolyl-(8')-oxymethyl]-, 2-[7'-allyl-quinolyl-(8')-oxy-methyl]-, or 2-[2'-methyl-quinolyl-(8')-oxy-methyl]-imidazoline.

The following compounds may for example also be obtained in similar manner:—

2-[phenoxy-methyl]-imidazoline-hydrochloride of melting point 130–132° C.

2-[2'-ethoxy-phenoxy-methyl]-imidazoline-hydrochloride of melting point 138–139° C.

2-[6'-allyl-2'-methoxy-phenoxy-methyl]-imidazoline-hydrochloride of melting point 128° C.

2-[4'-allyl-2'-methoxy-phenoxy-methyl]-imidazoline-hydrochloride of melting point 152–153° C.

2-[4'-methoxy-phenoxy-methyl]-imidazoline-hydrochloride of melting point 89–90° C.

2-[phenoxy-propyl]-imidazoline-hydrochloride of melting point 139–140° C.

2-[2'-methoxy-phenoxy-propyl]-imidazoline-hydrochloride of melting point 166° C.

2-[6'-allyl-2'-methoxy-phenoxy-propyl]-imidazoline picrate of melting point 189–190° C.

2-[2'-phenoxy-(1')-methyl]-imidazoline-hydrochloride of melting point 198–200° C.
2-[naphthoxy-(2')-methyl]-imidazoline-hydrochloride of melting point 206° C.
2-[quinolyl-(8')-oxy-methyl]-imidazoline-hydrochloride of melting point 191° C.

What I claim is:
1. The compounds of the formula

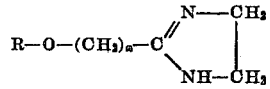

wherein R stands for a member of the group consisting of substituted and unsubstituted phenyl, naphthyl and quinolyl radicals, the substituent being a member of the group consisting of alkyl, alkenyl, hydroxy and alkoxy and $n$ stands for the numbers 1 to 6.

2. The compounds of the formula

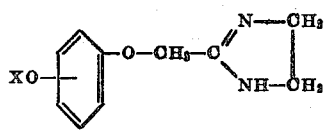

wherein X stands for alkyl.

3. The compounds of the formula

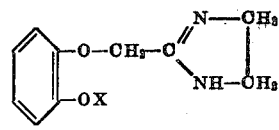

wherein X stands for alkyl.

ADOLF SONN.